United States Patent [19]

Nguyen et al.

[11] Patent Number: 4,742,144
[45] Date of Patent: May 3, 1988

[54] COPOLYMERIC COMPOSITION OF A FUNCTIONAL POLYSILOXANE AND A CARBOXYLIC ACID OR SALT THEREOF

[75] Inventors: Tinh Nguyen, Gaithersburg, Md.; James M. Gaul, Exton, Pa.

[73] Assignee: ARCO Chemical Company, Newtown Square, Pa.

[21] Appl. No.: 50,841

[22] Filed: May 15, 1987

Related U.S. Application Data

[60] Continuation-in-part of Ser. No. 851,770, Apr. 14, 1986, abandoned, which is a division of Ser. No. 662,105, Oct. 18, 1984, abandoned.

[51] Int. Cl.$^4$ .............................................. C08G 77/04
[52] U.S. Cl. ................................ 528/26.5; 556/436; 556/440; 556/442
[58] Field of Search ............... 528/26, 26.5; 556/436, 556/440, 442

[56] References Cited

U.S. PATENT DOCUMENTS 4,220,727 9/1980 Godlewski ........................... 528/52
4,452,962 6/1984 Ginnings et al. ................... 528/26

*Primary Examiner*—Melvyn I. Marquis
*Attorney, Agent, or Firm*—Delbert E. McCaslin

[57] ABSTRACT

An improvement is provided in the compression molding of lignocellulosic composite articles, such as particle or flake board, in which polyisocyanate binder systems are employed, the improvement being the provision of a novel copolymeric reaction product of a functional polysiloxane and a monocarboxylic acid or metal salt thereof as release agent on the mold surfaces to give multiple release. Optionally organopolysiloxane fluid may be employed along with the copolymer as diluent.

10 Claims, No Drawings

COPOLYMERIC COMPOSITION OF A FUNCTIONAL POLYSILOXANE AND A CARBOXYLIC ACID OR SALT THEREOF

CROSS REFERENCE TO RELATED APPLICATIONS

This application is a continuation-in-part application of co-pending application Ser. No. 851,770 filed Apr. 14, 1986. and entitled A COPOLYMERIC COMPOSITION OF A FUNCTIONAL POLYSILOXANE AND A CARBOXYLIC ACID OR SALT THEREOF which in turn is a division of co-pending application Ser. No. 662,105 filed Oct. 18, 1984 both now abandoned.

BACKGROUND OF THE INVENTION

The present invention relates to the compression molding of lignocellulosic materials into composite bodies, sheets and the like and more particularly to a method for preparation of particle board with polyisocyanate binder and the use of a functional polysiloxane-monocarboxylic acid or metal salt copolymer as a release agent capable of providing multiple release from the forming mold surfaces.

The molding of lignocellulosic and lignocellulosic-containing fibers, particles or layers to form composite articles is known. Organic di - and polyisocyanates as useful binders for lignocellulose materials have been known for some time and give to particle board products increased stability and mechanical strength; see, for example, U.S. Pat. Nos. 3,428,592; 3,440,189; 3,557,263; 3,636,199; 3,870,665; 3,919,017 and 3,930,110. It is also known in the art that the isocyanate binders are mixed with the wood particles utilized as the base for the particle board. A wood chip or particle and isocyanate binder mixture is then formed into a mat and molded with pressure and temperature to the desired size or shape. Water emulsion polyisocyanate binder systems for use with lignocellulosic particles to prepare particle board are also known. A principal disadvantage of the use of isocyanates in the preparation of particle board is due to their excellent adhesive properties. Thus, isocyanate systems, either the water emulsion or the straight polyisocyanate binders, stick tenaciously to the metal caul plates which are employed to support the wood particles during transporting and the pressing or molding processes. Such poor release of the molded particle board from the caul or mold surface creates difficulty in the cleaning and automatic handling of the cauls. In order to prevent the sticking problem, external release agents have been developed and applied to the caul plates or platens or mat surface as described for example in U.S. Pat. No. 4,110,397. Other conventional release agents such as oils, waxes, polishes, silicones and polytetrafluoroethylene have been unsatisfactory as have the specialized urethane release agents including those used in structural foam applications. Another method to overcome the sticking problem has been to overlay the isocyanate bound lignocellulosic particles with a veneer of wood as shown, for example, in U.S. Pat. Nos. 3,390,110; 4,197,219 and 3,919,017 or with the use of a release paper. These methods have the disadvantage of either adding more cost to the product or of not fully utilizing the superiority of the isocyanate binder. Many of the release agents developed to date have to be applied during every composite production cycle in large quantities to be effective.

SUMMARY OF THE INVENTION

The present invention provides for the preparation of lignocellulosic composite articles or sheets which comprises shaping in a mold or between mold surfaces a mixture of lignocellulosic particles and a polyisocyanate based binding agent, there being provided on the mold surface or surfaces a copolymer of a functonal polysiloxane and a monocarboxylic acid or metal salt thereof as release agent which may also be admixed with an organopolysiloxane fluid as a diluent.

It is an object of the present invention to provide novel compositions which serve as release agents and provide for multiple release of the molded articles.

Another object is to provide release agents which are readily applied and adhere to the mold surfaces.

A further object is to provide release agents which need only be applied in small amounts.

These and other objects and advantages of this invention will become apparent from the description of the invention and from the claims.

DETAILED DESCRIPTION OF THE INVENTION

The present invention comprises a method for the preparation of lignocellulosic composite molded articles, particularly particle board, by bonding together wood chips or other lignocellulosic or organic material using heat and pressure with an organic polyisocyanate employed as the binding agent and with the application of a film of release agent by dipping, spraying or wiping of a copolymer of a functional polysiloxane and a monocarboxylic acid or metal salt thereof to the mold surface or surfaces. A functional polysiloxane having the formula

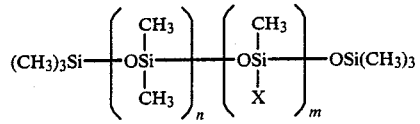

wherein n is an integer of from 5 to 30, m is an integer of from 1 to 20 and X is a group selected from —CH$_2$OH,

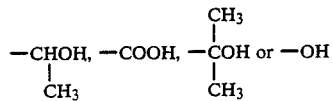

is reacted with a monocarboxylic acid or a metal salt of the monocarboxylic acid which has the formula (CH$_3$—(CH$_2$)$_y$ COO)$_r$—Z wherein $y$ is an integer of from 5 to 24, $r$ is an integer of from 1 to 3 and $z$ is selected from H, Na, Li, Ca, Ba, Cd, Mg, K or Fe, to form the copolymer release agent of the present invention. For essentially permanent release or longer production use cycles the mold surface or surfaces with film applied may be heated to between 75° C. and 200° C. for from 1 to 5 minutes before use.

The molded lignocellolusic composite such as, for example, particle board or flake board is generally prepared by spraying the particles with the polyisocyanate binder as they are being mixed or agitatated in suitable and conventional equipment such as a blender. Suitably polyisocyanate binder use levels, based on the weight of oven dried (0% moisture content) lignocellulosic material is from about 1.5 to 12 and preferably 2.5 to 6.5 weight percent. Other materials such as fire retardants may also be added to the particles or sprayed with the binder during the blending or mixing step.

After forming a uniform mixture the coated lignocellulosic particles are formed into a loose mat or felt in the desired proportions onto a caul plate of polished aluminum or steel which serves to carry the "cake" into the heated press to consolidate the wood particles into a board of desired thickness. Temperatures of the press are generally between about 140° and 220° C. and pressures of from about 100 to 600 psi. Pressing times are from about 1 to 10 preferably 3 to 5 minutes. Pressing times, temperatures and pressures vary widely depending on the thickness of the board produced, the desired density of the board, the size of the lignocellulosic particles used, and other factors well known in the art.

The isocyanate binding agent will generally be an organic polyisocyanate used alone but may also be in admixture with another type of binding agent, e.g. a synthetic resin glue, or in admixture with diluents such as propylene carbonate. The isocyanate may be applied in liquid form, as a solution in an inert solvent or in the form of an aqueous emulsion.

The polyisocyanate component which is used in the present invention in the binder system can be any organic polyisocyanate and include aliphatic, alicyclic and aromatic polyisocyanates that contain at least two isocyanate groups per molecule. Such polyisocyanates include the diisocyanates and higher functionality isocyanates. Mixtures of polyisocyanates which may be used are, for example, the mixtures of di- and higher functional polyisocyanates produced by phosgenation of aniline-formaldehyde condensate or as described in U.S. Pat. Nos. 3,962,302 and 3,919,279. The organic polyiso-cyanates may be isocyanate-ended prepolymers made by reacting under standard known conditions, an excess of a polyisocyanate with a polyol which on a polyisocyanate to polyol basis may range from about 20:1 to 2:1 and include for example, polyethylene glycol, polypropylene glycol, triethylene glycol, etc. as well as glycols or polyglycols partially esterified with carboxylic acids including polyester polyols and polyether polyols. Illustrative of organic polyisocyanates which may be employed include, for example, toluene-2, 4- and 2,6-diisocyanates or mixtures thereof, diphenylmethane diisocyanate, m- and p-phenylene diisocyanates or mixtures thereof, m- and p-diphenylene diisocyanates, polymethylene polyphenyl isocyanates, naphthalene-1, 5-diisocyanate, chlorophenylene diisocyanate α,α-xylene diisocyanate, triphenylmethane triisocyanate, hexamethylene diisocyanate, 3, 3'-ditolylene-4,4 diisocyanate, butylene 1,4-diisocyanate, octylene-1,8-diisocyanate, 1,4-, 1,3- and 1,2-cyclohexylene diisocyanate and in general the polyisocyanates disclosed in U.S. Pat. Nos. 3,577,358; 3,012,008 and 3,097,191. The preferred polyisocyanates are the diphenylmethane diisocyanate 2,4' and 4,4' isomers including the 2,2' isomer and the higher functional polyisocyanate and polymethylene polyphenyl isocyanate mixtures, which may contain from about 20 to 85 weight percent of the diphenylmethane diisocyanate isomers. Typical of the preferred polyisocyanates are those sold commercially as "Rubinate-M" (Rubicon Chemicals, Inc.). In general the organic polyisocyanates will have a molecular weight in the range between about 100 and 10,000. The aqueous organic polyisocyanate or isocyanate-terminated prepolymer emulsions are generally prepared by using any of the techniques known in the art for the preparations of aqueous emulsions or dispersions prior to use of the composition as binder. In general the polyisocyanate is dispersed in water in the presence of an emulsifying or surface active agent which may be any of the emulsifying agents also known in the art including anionic and nonionic agents. Preparation of the aqueous emulsions may be carried out as described in U.S. Pat. Nos. 3,996,154; 4,143,014 and 4,257,995.

The lignocellulosic materials employed to prepare the molded compositions using polyisocyanate binders include wood chips, wood fibers, shavings, sawdust, wood wool, cork bark and the like products from the woodworking industry. Fibers, particles, etc. from other natural products which are lignocellulosic such as straw, flax residues, dried weeds and grasses, nut shells, hulls from cereal crops such as rice and oats and the like may be used. In addition, the lignocellulosic materials may be mixed with inorganic flakes or fibrous material such as glass fibers or wool, mica and asbestos as well as with rubber and plastic materials in particulate form. The lignocellulose may contain a moisture (water) content of up to 25 percent by weight but preferably contains between 4 and 12 percent by weight moisture.

The release agents of the present invention consisting of a copolymer of a functional polysiloxane and a monocarboxylic acid or metal salt thereof are prepared by reacting at a temperature of from about 50° C. to 150° C. preferably 90° C. to 110° C. an excess of a silanol terminated functional polysiloxane having the formula

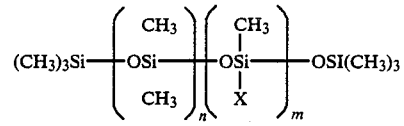

wherein n is an integer of from 5 to 30, m is an integer of from 1 to 20 and X is a group selected from

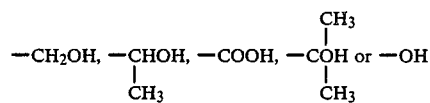

with a monocarboxylic acid or a metal salt of the monocarboxylic acid having the formula $(CH_3-(CH_2)_y COO)_r-Z$ wherein y is an integer of from 5 to 24, r is an integer of from 1 to 3 and Z is a group selected from Hydrogen, Na, Li, Ca, Ba, Cd, Mg, K or Fe. The acid or salt may also be hydroxy substituted such as, for example 12-hydroxystearic acid. The reaction may be carried out in the presence of inert solvents such as the aromatic or aliphatic hydrocarbons, e.g., toluene, xylene, benzene, heptane, hexane, etc. 5 to 50% solids solutions may be prepared by the condensation process but are preferably prepared and applied as 10 to 20% solids solutions. Typical monocarboxylic acids or metal salts which may be employed to prepare the copolymer are for example capric, lauric, palmitic, stearic, oleic, linoleic and the like as well as potassium oleate, calcium stearate, iron stearate, sodium palmitate, cadmium stearate, magnesium deconoate, etc.

As indicated herein above organopolysiloxane fluids employed along with the copolymeric functional polysiloxane-monocarboxylic acid or monocarboxylic acid salt release agents as a diluent and are used in amounts of from 0 to 25 weight percent, preferably from 10 to 20 weight percent based on the total copolymer-organopolysiloxane fluid mixture. The organopolysiloxane fluids suitable for use in this invention are generally alkyl-terminated polysiloxane fluids having from 1 to 18 carbon atoms bonded to the silicon atom. Examples of suitable organopolysiloxane fluids are those having alkyl radicals such as methyl, ethyl, propyl, butyl, hexyl, octyl, decyl, dodecyl, tetradecyl, hexadecyl, octadecyl and the like; aryl radicals such as phenyl and naphthyl and mixtures thereof. Generally, it is preferred that the organopolysiloxane be free of terminal-hydroxyl groups, however, a small number of terminal-hydroxyl groups will not materially affect the mold release composition. The organopolysiloxane may have a minor proportion of molecules with only one hydroxyl group or there may be a small number of molecules present carrying in excess of two hydroxyl groups. However, as mentioned previously, it is preferred that the organopolysiloxane be substantially free of hydroxyl groups. In general, the polysiloxane fluids should have a molecular weight of between about 3000 and 90,000 which is equivalent to a viscosity of between about 50 and 100,000 centipoises, preferably from about 100 to 5000 centipoises. Optimum results have been obtained in the lower portion of these ranges such as from about 200 to 500 centipoises. In addition, it is possible to combine high and low viscosity fluids to form a fluid having the desired viscosity range.

The organopolysiloxane fluids used in accordance with this invention may be represented by the formula

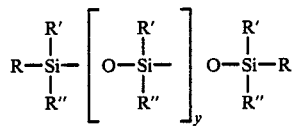

wherein R,R' and R" which may be the same or different represent organic groups having from 1 to 18 carbon atoms, preferably alkyl groups having from 1 to 4 carbon atoms and y has a value of from 80 to about 150,000.

The novel mold release agents of the instant invention, whether the copolymeric release agent alone or the copolymer admixed with an organopolysiloxane fluid, may be employed in a liquid organic solvent which would preferably be sufficiently volatile to vaporize during the application process. Preferred solvents include toluene, xylene, benzene, naphtha type solvents, higher $C_4$ to $C_{10}$ alcohols such as isobutanol and hydrocarbon solvents such as perchloroethylene.

The copolymeric release agent of the present invention may be applied to the mold surfaces as a concentrated or dilute solution, water emulsion or as a dispersion. It is preferred that the release agent composition be dissolved in a volatile organic solvent such as a mixture of toluene and isobutanol and then sprayed, wiped or brushed onto the mold surfaces in the form of a thin film. This may best be obtained by rubbing the mold surface or surfaces with a swab saturated with a solution of the release composition. However, when practical, the mold surfaces may be sprayed with the composition to form a thin film thereon.

Once the release composition has been applied to the mold surfaces, it may be used immediately. However, it is preferred that the coating be dried especially when an organic solvent has been used. More preferably, as indicated hereinbefore the coated mold surfaces are heated to between about 75° to 200° C., for from 1 to 5 minutes to fill all pores and openings and to provide for an essentially permanent release or longer production use cycles.

The following examples are provided to illustrate the invention in accordance with the principles of this invention, including examples of a comparative nature, but are not to be construed as limiting the invention is any way except as indicated by the appended claims.

EXAMPLE 1

580 grams of pine wood chips dried to a moisture content of 6 percent were placed in an open tumbler-mixer. During tumbling 16 grams of a diphenylmethane diisocyanatepolymethylene polyphenylisocyanate (PMDI) mixture having a 46.5 percent diphenylmethane diisocyanate content as a binder was sprayed evenly onto the wood chips by an air pressurized system. Two new aluminum caul plates 12"×12"×3/16" were wiped with a cloth saturated with a mixture of 10 parts by weight of a copolymer of a silanol (—CH$_2$OH) terminated polydimethyl siloxane, having a molecular weight of 28,000 and 12-hydroxy stearic acid and 90 parts by weight toluene. The copolymer was prepared by charging 1 part by weight of the silanol (—CH$_2$OH) terminated siloxane and 1 part by weight 12-hydroxy stearic acid into a 250 ml reaction flask in 50% by weight toluene. The reaction was run for 4 hours at 95° C. in nitrogen with stirring. The reaction was cooled and diluted with toluene to give a 10% solids solution. The polyisocyanate coated wood chips were then preformed in a box 10.5 inches square and 12 inches high which was supported by one of the release agent coated caul plates and prepressed to form a thick mat. The box was then taken out and the second coated caul plate placed on top of the mat. The whole assembly was subjected to a temperature of 190° C., pressed to stops at a thickness of 13 mm and held for 4 minutes and the pressure released. The lignocellulosic (wood chip board) composite was easily released from the caul plates. The board making procedure as above was repeated six additional times using the same originally coated caul plates with easy release of the composite.

EXAMPLE 2

The procedure of Example 1 was repeated except that the aluminum caul plates wiped with the 28,000 mol wt. silanol terminated polydimethyl siloxane-12 hydroxy stearic acid copolymer release agent were heated at 176° C. for 3 minutes prior to use. Seven repeated cycles of board preparation and release at 190° C. were recorded.

EXAMPLES 3 to 8

Various copolymers of silanol terminated polydimethyl siloxanes, molecular weight 28,000, with a monocarboxylic acid or metal salt thereof were prepared by charging 1 part by weight of the silanol and 1 part by weight of the acid or metal salt into a reaction flask with 50% by weight toluene. The reaction was run for four hours at 95° C. in nitrogen with stirring and then cooled and diluted with toluene to provide a 10% solids solution. The procedure of Example 1 was repeated to produce particle board using the release agents and giving the release cycles as indicated below:

| Example No. | Copolymer Release Agent | Release Cycles at 190° C. |
|---|---|---|
| 3 | Silanol (—CH$_2$OH) terminated Polydimethyl Siloxane and Calcium Stearate | 5 |
| 4 | Silanol (—CH$_2$OH) terminated Polydimethyl Siloxane and Iron Stearate | 6 |
| 5 | Carbinol (—COH) terminated Polydimethyl Siloxane and Potassium Oleate | 6 |
| 6 | Carboxy (—COOH) terminated Polydimethyl Siloxane and 12-Hydroxy Stearic Acid | 7 |
| 7 | Silanol (—CH$_2$OH) terminated Polydimethyl Siloxane and Capric (decanoic) Acid | 6 |
| 8 | Silanol (—CH$_2$OH) terminated Polydimethyl Siloxane and Palmitic (hexadecanoic) acid | 7 |

EXAMPLE 9

The procedure of Example 2 was repeated employing 85% of the copolymer of Example 1 mixed with 15% polysiloxane fluid and diluted to a 10% solids solution with toluene. Six repeated cycles of particle board preparation and release at 190° C. were recorded.

EXAMPLE 10

The procedure of Example 2 was repeated employing an 80:20 mixture of the copolymer of Example 3 and polydimethyl siloxne fluid diluted to 10% in a 50:50 mixture of toluene and isobutanol. Six release cycles were recorded at 190° C.

EXAMPLE 11 CONTROL

Example 1 was repeated except that no release agent was applied to the caul plates. The pressed lignocellulosic composite could not be released even after cooling down.

EXAMPLE 12 CONTROL

Examples 1 and 2 were repeated except that the caul plates in three composite preparations were wiped with a 15% solution of zinc stearate, aluminum stearate and lithium stearate in isobutanol. Only one cycle of release was recorded with each when hot (190° C.)

We claim:

1. A Copolymeric polysiloxane composition, useful as a release agent for lignocellulosic composite molded articles containing an organic polyisocyanate based binder, comprising the copolymeric reaction product of a functional polysiloxane having the formula:

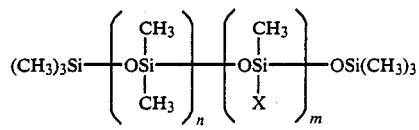

wherein n is an integer of from 5 to 30, m is an integer of from 1 to 20 and X is a group selected from

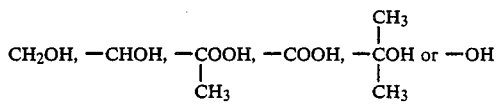

and a monocarboxylic acid or metal salt thereof having the formula $(CH_3-(CH_2)_y COO)_r-Z$ wherein y is an integer of from 5 to 24, r is an integer of from 1 to 3 and Z is a group selected from hydrogen, Na, Li, Ca, Ba, Cd, Mg, K or Fe.

2. A composition according to claim 1 wherein the functional polysiloxane is —CH$_2$OH terminated.

3. A composition according to claim 1 wherein the functional polysiloxane is

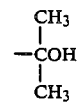

terminated.

4. A composition according to claim 1 wherein the functional polysiloxane is —COOH terminated.

5. A composition according to claim 1 wherein the monocarboxylic acid of the copolymer is palmitic acid.

6. A composition according to claim 1 wherein the monocarboxylic acid salt is calcium stearate.

7. A composition according to claim 1 wherein the monocarboxylic acid salt is iron stearate.

8. A composition according to claim 1 wherein the monocarboxylic acid salt is potassium oleate.

9. A composition according to claim 1 wherein the monocarboxylic acid of the copolymer is stearic acid.

10. A copolymeric polysiloxane composition, useful as a release agent for lignocellulosic composite molded articles containing an organic polyisocyanate binder, comprising the copolymeric reaction product of a functional polysiloxane having the formula:

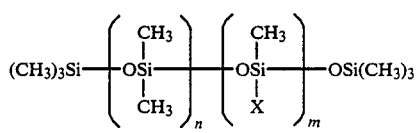

wherein n is an integer of from 5 to 30, m is an integer of from 1 to 20 and X is a group selected from

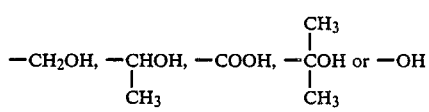

and 12-hydroxy stearic acid or a Na, Li, Ca, Ba, Cd, Mg, K or Fe metal salt thereof.

* * * * *